(12) United States Patent
Yamamoto

(10) Patent No.: US 9,779,577 B2
(45) Date of Patent: Oct. 3, 2017

(54) GAME SYSTEM, GAME CONTROL METHOD AND STORAGE MEDIUM

(71) Applicant: Konami Digital Entertainment Co., Ltd., Minato-ku, Tokyo (JP)

(72) Inventor: Kenichi Yamamoto, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 209 days.

(21) Appl. No.: 14/623,363

(22) Filed: Feb. 16, 2015

(65) Prior Publication Data

US 2015/0161845 A1 Jun. 11, 2015

Related U.S. Application Data

(63) Continuation of application No. PCT/JP2013/063032, filed on May 9, 2013.

(30) Foreign Application Priority Data

Sep. 5, 2012 (JP) .................................. 2012-195454

(51) Int. Cl.
*A63F 9/24* (2006.01)
*A63F 13/00* (2014.01)
(Continued)

(52) U.S. Cl.
CPC ...... *G07F 17/3211* (2013.01); *A63F 13/2145* (2014.09); *G07F 17/3225* (2013.01)

(58) Field of Classification Search
None
See application file for complete search history.

(56) References Cited

U.S. PATENT DOCUMENTS 5,555,364 A * 9/1996 Goldstein ............ G06Q 10/109
705/32
6,755,743 B1 6/2004 Yamashita et al.
(Continued)

FOREIGN PATENT DOCUMENTS

JP 3934649 B2 6/2007
JP 4252608 B2 4/2009
(Continued)

OTHER PUBLICATIONS

International Search Report (PCT/JP2013/063032); dated: Aug. 13, 2013.
(Continued)

*Primary Examiner* — Kevin Y Kim
(74) *Attorney, Agent, or Firm* — Howard & Howard Attorneys PLLC

(57) ABSTRACT

A game system includes a game machine having a monitor that displays a game screen and a touch panel. This game system: receives an operation related to the progress of a game displayed upon the game screen in a game operation area specified within the game screen; controls the progression of the game on the basis of the operation that is inputted; displays a comment window upon the game screen; receives a movement operation for the comment window inside a comment operation area specified in the game screen; controls the movement of the comment window on the basis of the operation that is inputted; and limits reception of an operation by the game operation area when the movement operation for the comment window has been made.

7 Claims, 10 Drawing Sheets

(51) Int. Cl.
*G06F 17/00* (2006.01)
*G06F 19/00* (2011.01)
*G07F 17/32* (2006.01)
*A63F 13/2145* (2014.01)

(56) References Cited

U.S. PATENT DOCUMENTS

| | | |
|---|---|---|
| 2004/0198497 A1 | 10/2004 | Yamashita et al. |
| 2004/0198498 A1 | 10/2004 | Yamashita et al. |
| 2005/0209008 A1 | 9/2005 | Shimizu et al. |
| 2010/0217798 A1 | 8/2010 | Asami |
| 2013/0130794 A1 | 5/2013 | Oshima et al. |

FOREIGN PATENT DOCUMENTS

| | | |
|---|---|---|
| JP | 2010-131082 A | 6/2010 |
| JP | 2011-5306 A | 1/2011 |
| JP | 2012-34792 A | 2/2012 |

OTHER PUBLICATIONS

Japanese Office Action with English Translation; dated: Aug. 1, 2013.
Chinese Office Action (English Translation and Original Chinese Document), dated: Jan. 22, 2017.

\* cited by examiner

GAME SYSTEM, GAME CONTROL METHOD AND STORAGE MEDIUM

CROSS-REFERENCE TO RELATED APPLICATION

This application is a continuation of PCT Application No. PCT/JP2013/063032, filed May 9, 2013, which claims priority to Japanese Patent Application No. 2012-195454, filed Sep. 5, 2012, the disclosures of which are hereby incorporated by reference in their entirety.

TECHNICAL FIELD

The present invention relates to a game system that is endowed with a function of displaying comments upon a game screen, and so on.

BACKGROUND ART

In recent years network services, as represented by SNS (an abbreviation of "social networking service") which are systems that implement communication between users via networks, have become very widespread. In the field of game systems, for example, a game system has been proposed which is capable of exchanging comments between a plurality of home-use game machines that are connected to a network (for example, refer to Patent Document #1). And a system has also been proposed that implements simulated communication between commercial game machines that are connected to a network, in which appropriate dialog corresponding to the state of a game is selectively transmitted and received (for example, refer to Patent Document #2).

CITATION LIST

Patent Literature

Patent Document #1: Japanese Laid-Open Patent Publication 2011-005306 and Patent Document #2: Japanese Laid-Open Patent Publication 2010-131082.

SUMMARY OF INVENTION

Technical Problem

In the case of, for example, a game machine on which a game is played by operating a touch panel that is superimposed upon a display unit upon which a game screen is displayed, when a comment that has been received is displayed upon the game screen, it becomes possible to perform operation to move that comment, or to perform operation to reply to it. If a comment display region that can be operated by touch and an operation area that has a relationship to the progression of the game are overlapped, then there is a fear that some action not intended by the player may be inputted, so that a negative influence will be exerted upon the progression of the game. On the other hand, if operations in relation to the progression of the game are limited when the comment is displayed, then this will also constitute a hindrance to the progression of the game, and may be a cause of dissatisfaction with playing the game.

Accordingly, the object of the present invention is to provide a game system and so on that prevents errors in operation related to comments and in operation related to the progression of the game performed by specifying a position upon a screen that is displayed upon a display unit.

Solution to Technical Problem

The game system of the present invention is a game system including a game apparatus comprising a display unit configured to display a game screen and an operation input unit capable of inputting an operation to perform specification of a position upon the game screen, and solves the problem described above by comprising: a game operation control device configured to receive an operation related to a progression of a game that is displayed upon the game screen within a game operation area that is specified within the game screen, and control the progression of the game on the basis of the operation corresponding to the game operation area; a comment operation control device configured to cause a comment to a player to be displayed upon the game screen, and receive an operation for movement of the comment within a comment operation area that is specified within the game screen and control shifting of the comment on the basis of the operation that is inputted; and a game operation limitation device configured to, when the game operation area and the comment operation area are provided within the game screen, limit reception of the operation in the game operation area when the operation for movement of the comment is performed.

And the game control method of the present invention is a game control method for a game system including a game apparatus comprising a display unit configured to display a game screen and an operation input unit capable of inputting an operation to perform specification of a position upon the game screen, and solves the problem described above by comprising: a game operation control process configured to receive an operation related to a progression of a game that is displayed upon the game screen within a game operation area that is specified within the game screen, and control the progression of the game on the basis of the operation corresponding to the game operation area; a comment operation control process configured to cause a comment to a player to be displayed upon the game screen, and receive an operation for movement of the comment within a comment operation area that is specified within the game screen and control shifting of the comment on the basis of the operation that is inputted; and a game operation limitation process configured to, when the game operation area and the comment operation area are provided within the game screen, limit reception of an operation in the game operation area when the operation for movement of the comment is performed.

And the storage medium of the present invention solves the problem described above by providing a storage medium storing a computer program to cause a computer of a game system including a game apparatus comprising a display unit configured to display a game screen and an operation input unit capable of inputting an operation to perform specification of a position upon the game screen to function as: a game operation control device configured to receive an operation related to a progression of a game that is displayed upon the game screen within a game operation area that is specified within the game screen, and control the progression of the game on the basis of the operation corresponding to the game operation area; a comment operation control device configured to cause a comment to a player to be displayed upon the game screen, and receive an operation for movement of the comment within a comment operation area that is specified within the game screen and control shifting of the comment on the basis of the operation that is inputted; and a game operation limitation device configured to, when the game operation area and the comment operation area are provided within the game screen, limit reception of an operation in the game operation area when the operation for movement of the comment is performed.

According to the present invention, operation related to the progression of the game is limited when a comment is displayed upon the game screen while the player is playing the game, and operation is performed to shift this comment to a different location. Since, when an operation that is intended to shift the comment is performed, priority is given to this operation, accordingly it is possible to prevent erroneous operation of which the player is not conscious.

In one aspect of the game system of the present invention, according to the operation for movement of the comment, the game operation limitation device may limit reception of the operation within the game operation area of which a portion is overlapped with the comment operation area. According to this, no hindrance is given to the progression of the game, since, during movement operation for the comment, operation within the game operation area of which a portion overlaps the comment operation area is limited. Smooth progression of the game becomes possible by making compatible movement operation of comments, and operation related to progression of the game in which no fear of erroneous operation occurs.

In one aspect of the game system of the present invention, the operation of moving the comment is performed by the comment operation control device by the position specified by the operation input unit being shifted within the comment operation area; and when the position specified by the operation input unit gets into the game operation area, the game operation limitation device limits the operation within the game operation area. Since, according to this, when the position operated by the player and specified by the operation input unit gets into the game operation area, only reception of operations within this game operation area is limited, accordingly it is possible to prevent erroneous operation while further restricting the subject of limitation of operation.

In one aspect of the game system of the present invention, the game operation limitation device may limit reception of the operation within the game operation area during an interval in which movement operation of the comment is being performed. According to this aspect it is possible to prevent erroneous operation, since reception of operations in the game operation area is limited while movement operation of the comment is being performed. And, in yet another aspect of the game system of the present invention, the operation input unit may be a touch panel that is superimposed upon the display unit and that is transparent to the game screen.

DESCRIPTION OF EMBODIMENTS

Figure 1:
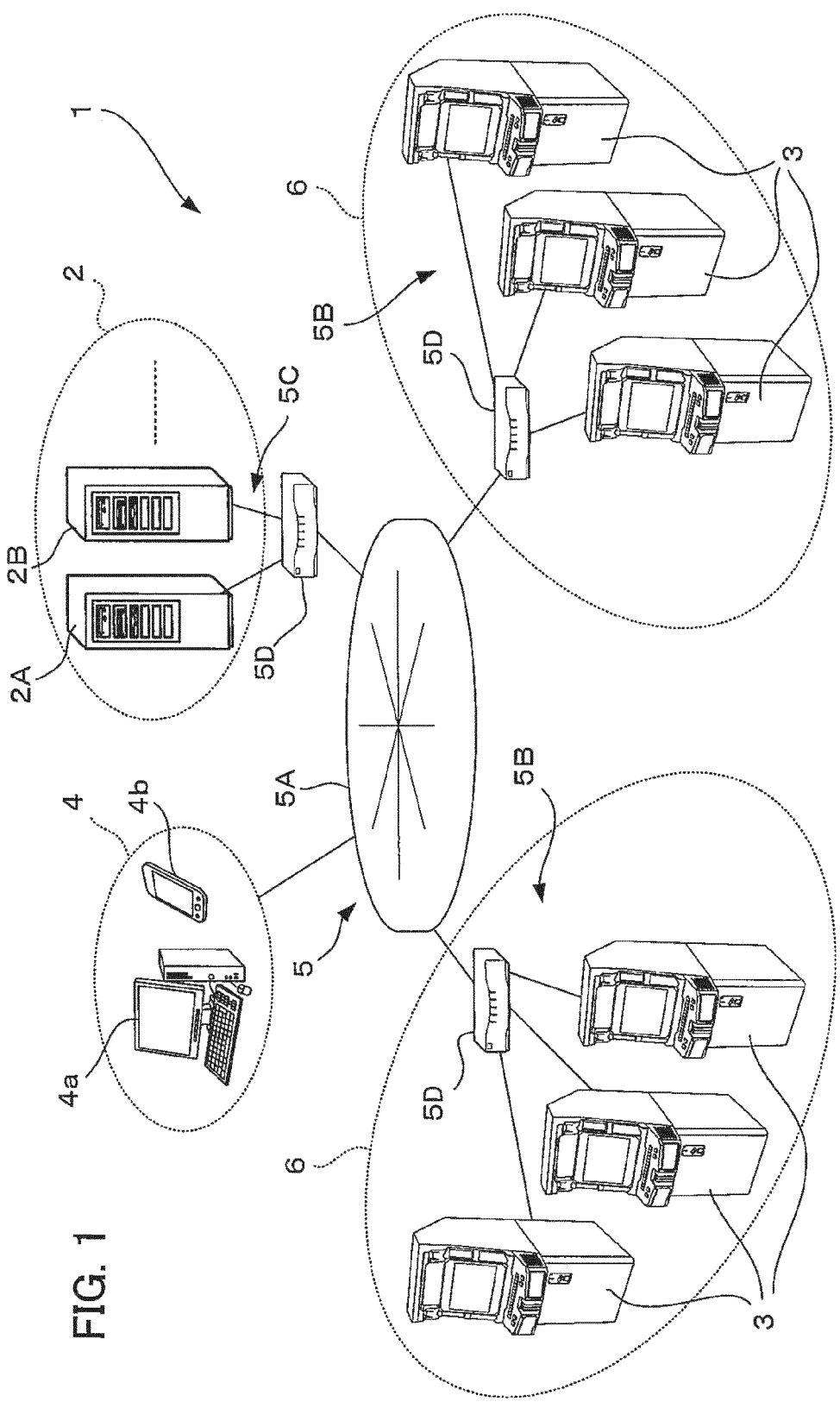
FIG. 1 is a figure showing the overall structure of a game system according to an embodiment of the present invention.

FIG. 1 is a figure showing the overall structure of a game system according to an embodiment of the present invention. This game system 1 includes a center server 2 which is a server device, and game machines 3 (corresponding to the "game apparatus" of the Claims) and user terminal devices 4 that serve as client devices that can be connected to the center server 2 via a predetermined network 5. The center server 2 is constructed as a single logical server device by a plurality of server units 2A, 2B, . . . being combined together. However, it would also be acceptable for the center server 2 to consist of a single server unit. Or it would also be possible for the center server 2 to be logically formed by employing cloud computing.

Each of the game machines 3 is built as a game machine for business use (i.e. for use in a commercial environment) that extracts payment of a predetermined playing charge from a user, and that allows the user to play a game to an extent corresponding to that playing charge. This type of game machine 3 is sometimes called an "arcade game machine". These game machines 3 are computer game apparatuses that are installed in predetermined institutions such as stores 6 or the like, with the principal objective being to increase profits by allowing a large number of users to play games repeatedly. It should be understood that an appropriate number of one or more game machines 3 are installed in each store 6. While the game machines 3 are drawn in FIG. 1 without any distinction, their hardware structure and their games may be selected as appropriate. The game machines 3 may be built as dedicated machines incorporating physical structures (for example operation units and so on) that are matched with specific games, or they may be built as general purpose machines that can handle games of various types by their software being rewritten.

On the other hand, the user terminal devices 4 are computer devices that can be connected to the network and that moreover are adapted for the use of individual persons. For example, a desktop type or book type personal computer 4a (hereinafter termed a "PC") or a mobile terminal device 4b like a portable telephone (including a smart phone) may be used as such a user terminal device 4. Furthermore, various types of computer device that can be connected to a network and that moreover are adapted to use by individuals such as console type game machines for household use, portable type game machines, portable type tablet terminal devices and so on may be used as such user terminal devices 4. By computer software of various types being implemented upon them, the user terminal devices 4 are capable of providing services of various types supplied by the center server 2 to their users.

The network 5 may have any appropriate structure, provided that it is capable of connecting each of the game machines 3 and the user terminal devices 4 to the center server 2. As one example, the network 5 may be configured so that it implements network communication by employing the TCP/IP protocol. Typically, the network 5 is constructed by the internet 5A which serves as a WAN and LANs 5B and 5C that connect the center server 2 and each of the game machines 3 to the internet 5A being connected together via routers 5D. The user terminal devices 4 may also be connected to the internet 5A by some appropriate structure. It should be understood that it would also be acceptable for local servers to be installed between the game machines 3 and the routers 5D of the stores 6, and for the game machines 3 to be connected via these local servers to the center server 2 so as to be capable of communication therewith. Moreover, in some cases, the server units 2A, 2B, . . . of the center server 2 are mutually connected together by the WAN 5A, instead of or in addition to the LAN 5C.

Figure 2:
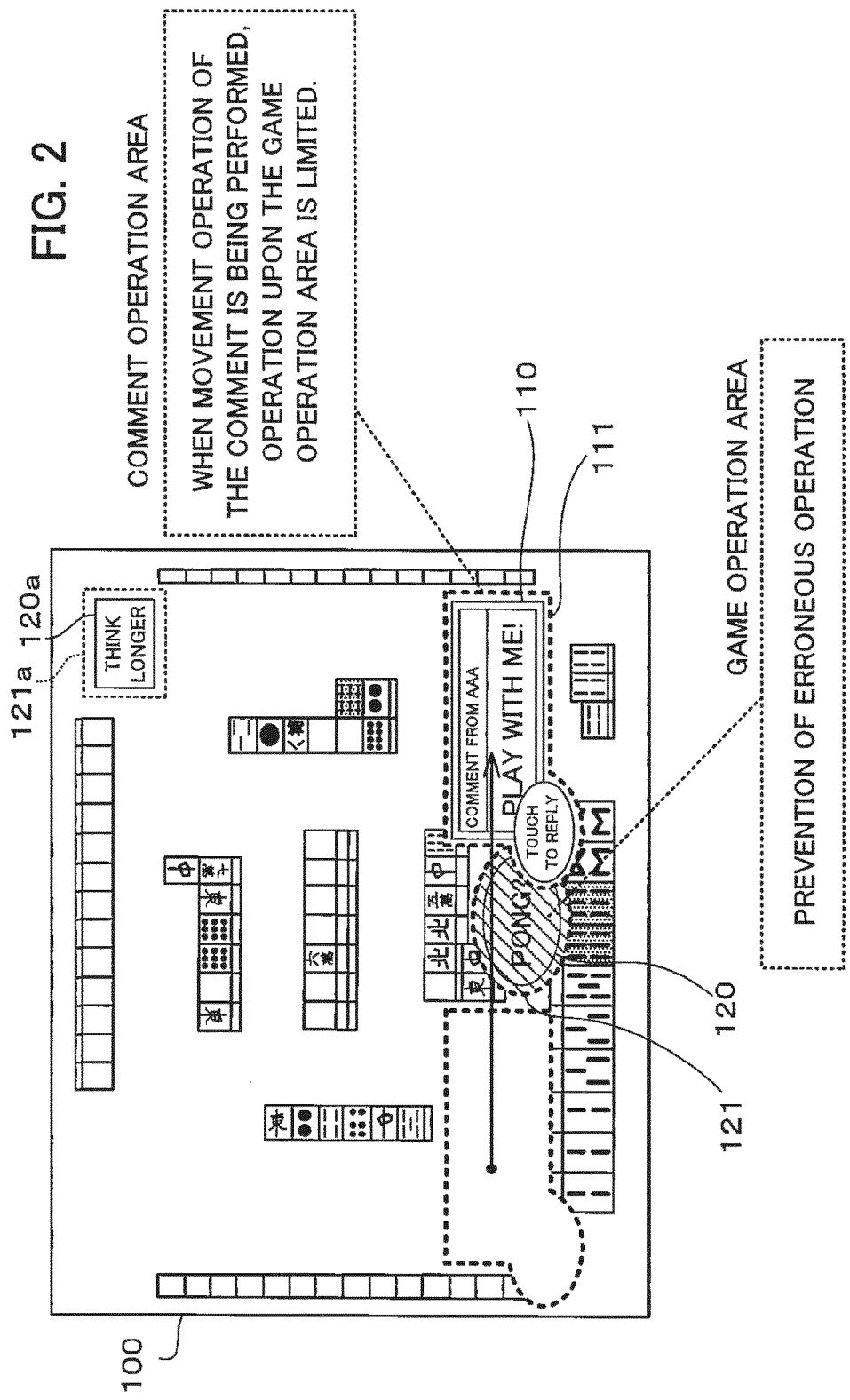
FIG. 2 is a figure for explanation of the workings of a game implemented upon this game system.

Next, the structure of the game implemented by the game system 1 will be explained with reference to FIG. 2. The game machine 3 comprises a monitor 37 which serves as a display unit upon which a game screen 100 is displayed, and a touch panel 38 that is overlaid over the monitor 37 and that serves as an operation input unit. A comment window 110 which is provided for communicating with other users is displayed as appropriate on the game screen 100 of the mahjong game that can be played on the game machine 3. When the user performs touch operation upon a comment operation area 111 that is occupied by the comment window 110, the user can send a reply message to the opposite party who has transmitted a comment. In the FIG. 2 example, this comment operation area 111 is surrounded by a broken line. As the message that can be transmitted, for example, it would be possible to arrange for the user to be able to select from a plurality of types of pre-written messages that have been prepared in advance, or it would also be possible to arrange for the user to be able to input any desired characters by displaying a flick input type keyboard.

When a comment has been displayed, by performing touch operation upon the comment operation area 111, it is possible to shift the comment within the game screen 100, to reply to it, to delete it, and so on. According to such operation by the user, an appropriate comment window 110 is displayed. The size of the comment window 110 and the location in which it is displayed may be changed as appropriate according to the progression of the game. Moreover, it would also be acceptable to arrange for a region of appropriate size to be designated for the comment operation area 111. For example, it would be possible to designate an elliptical region in which "touch to reply" is displayed as being the comment operation area 111. Moreover, it would be possible to shift the comment window 110 according to the progress of the game by touching the comment operation area 111 of the comment window 110, and by dragging the comment window 110 to the position to which it is desired to shift it while keeping a finger (including an actuation member which serves as a subject for operation input, such as a stylus or the like) touched upon the touch panel 38 which is the subject of operation input.

On the other hand, operations related to the progression of the game are also performed by touch operation upon the game screen 100. Referring to the example of FIG. 2, this is a state during the progression of the game in which performing "pong" is possible, and accordingly a game operation window 120 is displayed upon the game screen 100 asking "pong?". If the user wishes to perform "pong", then the user touch operates upon the game operation area 121 which is defined by the game operation window 120. Moreover, a "think longer" game operation window 120a is a time extension button that can be operated by touch operation. In FIG. 2, these game operation areas 121 and 121a are also shown by broken lines. Apart from the above, a plurality of game operation windows 120 that correspond to operations of various types are also provided.

If the game operation area 121 and the comment operation area 111 are both displayed at the same time, then erroneous functioning can occur due to mistaken operation by the user. To explain this with reference to the FIG. 2 example, while it may be the intention of the user, while keeping the comment operation area 111 touched, to perform movement operation to some desired position, if the user's finger that is touching upon the game screen 100 touches the game operation area 121 so that processing to operate in the game operation area 121 is performed contrary to the user's intention, then the user may perform a "pong" that the user does not intend, so that the user may suffer a defeat. Due to this, when movement operation of the comment window 110 is being performed, operation upon the game operation area 121 is limited. While in the FIG. 2 example the game operation area 121 is positioned upon the movement operation line of the comment operation area 111, operation upon this game operation area 121 is limited. Due to this, while comment movement operation is being performed, unintended and erroneous operation corresponding to the game is prevented. It should be understood that, while movement operation on the basis of the position that the user is touching and of the direction in which the user's finger shifts is detected, for this detection, any appropriate per se known technique may be used for using the touch panel 38 that is employed.

Figure 3:
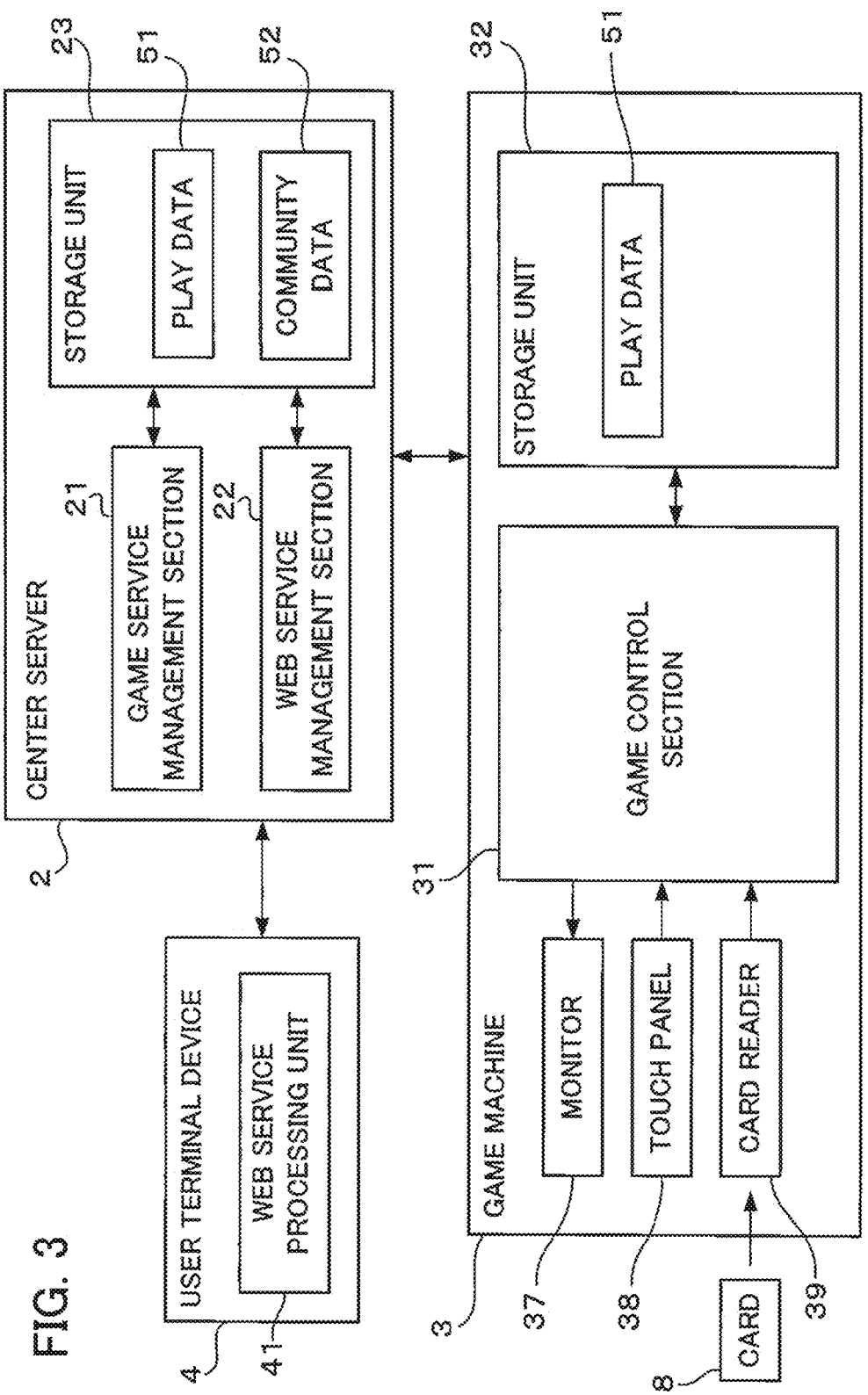
FIG. 3 is a functional block diagram for explanation of the structure of main portions of a control system related to the game system.

FIG. 3 is a functional block diagram for explanation of the structure of main portions of a control system of the game system 1, related to the center server 2, to the game machines 3, and to the user terminal devices 4. The center server 2 includes a game service management section 21, a web service management section 22, and a storage unit 23. The management sections 21 and 22 are logical devices that are implemented as combinations of the computer hardware of the center server 2 (including its CPU and memory required for its operation, i.e. an internal storage device) and software. And the storage unit 23 is an external storage device that may be implemented as a storage unit such as a hard disk array or the like. The storage unit 23 could be constructed so as to hold all of its data in a single storage unit, or could be constructed so as to store the data dispersed over a plurality of storage units. While data of various types is stored in the storage unit 23, only play data 51 and community data 52 are shown in FIG. 3. The play data 51 is data in which details of the play of the game are stored, in order for the user to continue to play the game on each of the user's turns. The play data 51 is generated for each of the users, and is stored in the storage unit 23 in correspondence with the identification information for the users. In FIG. 3, only the play data 51 corresponding to the identification information for a single user is shown. And the community data 52 is data in which is recorded information of various kinds that must be referred to when the user employs community services. This community data 52 is also created for each of the users, and is recorded in the storage unit 23 in correspondence with the identification information for the users. Only the community data 52 corresponding to the identification information for a single user is shown in FIG. 3.

The game service management section 21 provides predetermined game services to the game machines 3. Such game services may, for example, be: the service of authenticating a user by receiving authentication information for the user from a game machine 3 (as one example, unique identification information and a unique password for each user), storing play data 51 received from a game machine 3 and corresponding to that user in the storage unit 23 or supplying play data 51 for a user that is stored in the storage unit 23 to a game machine; the service of enabling the users of a plurality of game machines 3 to participate in a communal game by matching them according to some condition; the service of updating the software (i.e. the game program or data) of a game machine 3 via the network 5, and so on. The web service management section 22 provides web services of various types to the user terminal devices 4. As examples, the web service management section 22 may authenticate a user by receiving authentication information for the user (as one example, unique identification information and a unique password for each user) from a user terminal device 4, and may, in response to a request from that user who has been authenticated, supply the play data 51 for that user to the user terminal device 4 for perusal.

Moreover, a charging service function is also implemented upon the center server 2 of charging, to each user of the game machines 3 and of the user terminal devices 4, a payment as a consideration for supply of chargeable services in the game, and of collecting that payment from the user. In concrete terms, as a technique for performing such settlements, some method of electronic settlement for making payments by employing exchange of electronic data, such as with a credit card, a debit card, or an electronic payment system, may be employed, and any such method will be acceptable, provided that it is capable of charging the user a fee as consideration for a service, and of collecting the price for such a consideration. No structure or procedure for implementing electronic settlement in concrete terms will be explained herein, since this is a per se known technology.

Figure 5:
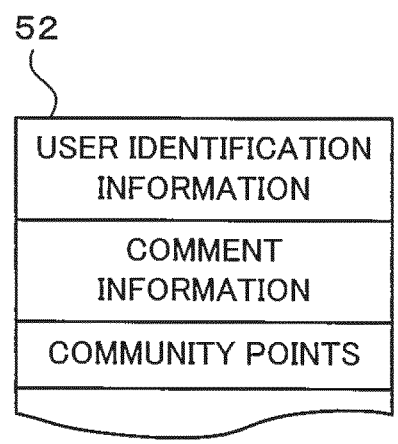
FIG. 5 is a figure showing an example of community data.

To continue, a game control section 31 and a storage unit 32 are provided to each of the game machines 3. The game control section 31 is a logical device that is implemented as a combination of the computer hardware of the game machine 3 (including its CPU and memory, required for its operation, i.e. an internal storage device) and software. This game control section 31 performs control for executing calculations of various types required for the progression of the game, and also performs processing of various types required for exploiting the game services supplied by the game service management section 21 of the center server 2. The game control section 31 executes processing corresponding to touch operation from the user in relation to operation in the comment window 110 that is displayed upon the game screen 100, and performs calculation processing for specifying and shifting the region and so on in relation to the comment operation area 111 that is receiving touch operation. Moreover, the game control section 31 executes processing corresponding to touch operation from the user in relation to operation in the game operation window 120 that is displayed upon the game screen 100, and performs calculation processing for specifying and shifting the region and so on in relation to the game operation area 121 that is receiving touch operation. Furthermore, the game control section 31 limits operation upon the game operation area 121 when the user is performing movement operation of the comment window 110. And the storage unit 32 is an external storage device that is implemented with a storage unit such as a hard disk, a semiconductor storage device, or the like. While data of various types is recorded in the storage unit 32, only the play data 51 supplied from the center server 2 is shown in FIG. 5.

Each of the user terminal devices 4 is provided with a web service processing unit 41, which is a logical device that is implemented as a combination of the computer hardware of the user terminal device 4 (including its CPU and memory required for its operation, i.e. an internal storage device) and software. This web service processing unit 41 performs processing required for exploiting services of various types that are provided by the web service management section 22 of the center server 2. For example, the web service processing unit 41 may perform processing required for creating comments for users who are playing on the game machines 3, and processing that is required for utilizing community functions, such as processing for transmission and reception and so on. It should be understood that, while an external storage device for storing appropriate data is also provided to the user terminal device 4, this is omitted from the figure.

Furthermore, input and output devices of various types such as a monitor 37, a touch panel 38, and a card reader 39 are provided to the game machine 3. The card reader 39 is a device for reading a card ID recorded upon a card 8 which the user possesses, which is one type of identification information which must be employed for authenticating a user, and which is unique for each card. It should be understood that the user identification information which must be employed for identifying a user may be different for authentication of the user upon a game machine 3 and for authentication of the user upon a user terminal device, or may be common. For example, it would be acceptable to arrange for a card ID that is recorded upon a card 8 of the user to be employed as identification information upon a game machine 3, so that this card ID and the play data 51 are stored in the storage unit 23 in mutual correspondence; while, on the other hand, upon a user terminal device 4, a user ID that is set uniquely for each user is utilized as identification information for the user. In this case, by providing a correspondence between the user IDs and the card IDs, it would be possible to employ either of these IDs as user identification information.

Figure 4:
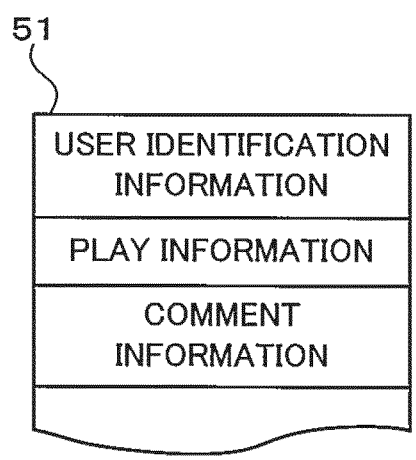
FIG. 4 is a figure showing an example of play data.

FIG. 4 shows an example of the play data 51. This play data 51 is data that is created for each user, and that has a structure in which various types of information required for playing the game, such as play information for the user who is the subject and comment information and so on, is recorded in correspondence with the identification information for that user (while the card ID is one example of such identification information, some other ID that corresponds with the card ID would also be acceptable). The play information is data in which results of various kinds correlated with playing the game are recorded, such as save data for games that the user has played on the game machine, the number of times that the user has played the game, the results the user has achieved, the user's grade, the number of points the user has acquired, and so on. And the comment information is data in which the user has recorded character strings that are to be transmitted to other users as comments from the game machine 3, and data in which comments that the user has received from other users are recorded. Apart from comments that have been prepared in advance, it would also be acceptable for these comments registered in this comment information that can be transmitted to include character strings specified by the user.

FIG. 5 shows an example of the community data 52. This community data 52 is data having a structure in which information such as comment information or a number of community points for the user who is the subject and so on is recorded in correspondence with the identification information for that user (while, for example, a community ID, the user ID, or the card ID may be used for the community function, the information specifying the user could be some other ID or the like that can be made to correspond to those IDs). Apart from the information explained in connection with the play data 51, the comment information could include a status for each comment determining whether or not it is as yet unread, whether or not it has yet been replied to, and so on. Appropriate information for the community function is recorded in the community data 52. The community points are points that are awarded to the user as benefits corresponding to the extent to which the user uses community services. These points may, for example, be consumed when using chargeable services supplied by the center server 2, or may be appropriated as a part of the charge for the game, or in order to receive a benefit of some kind in the game supplied by the game machine 3. Community points are awarded by the game system 1 when the user uses the community function to transmit or to receive a comment.

Figure 6:
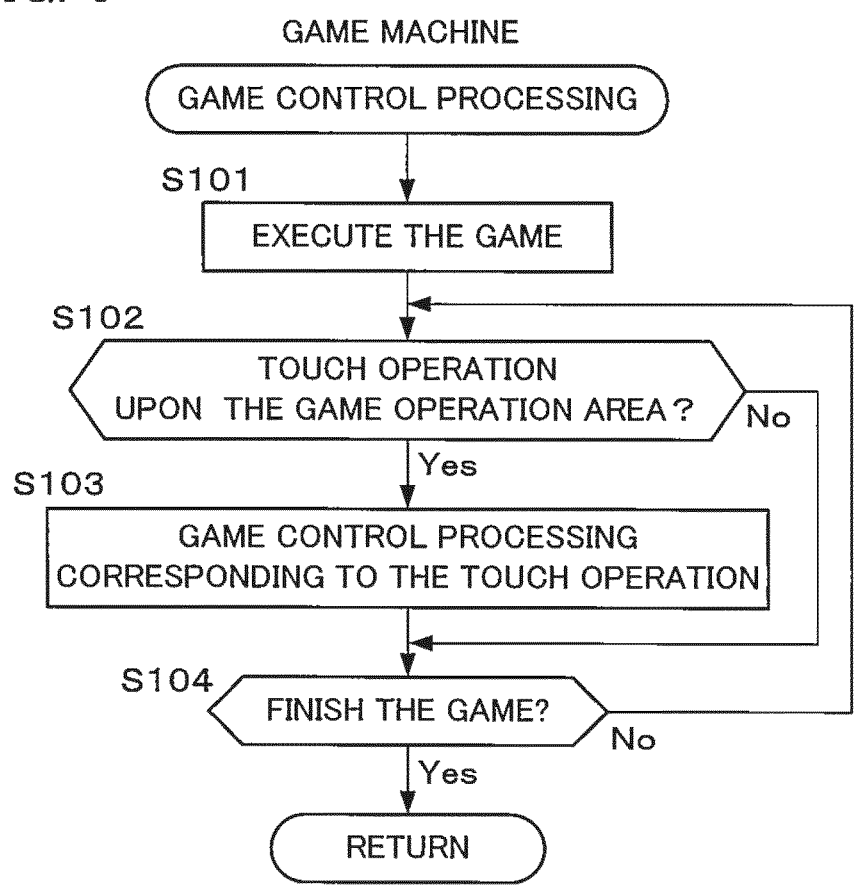
FIG. 6 is a flow chart showing a game operation control processing executed by a game control section of the game machine.
Figure 7:
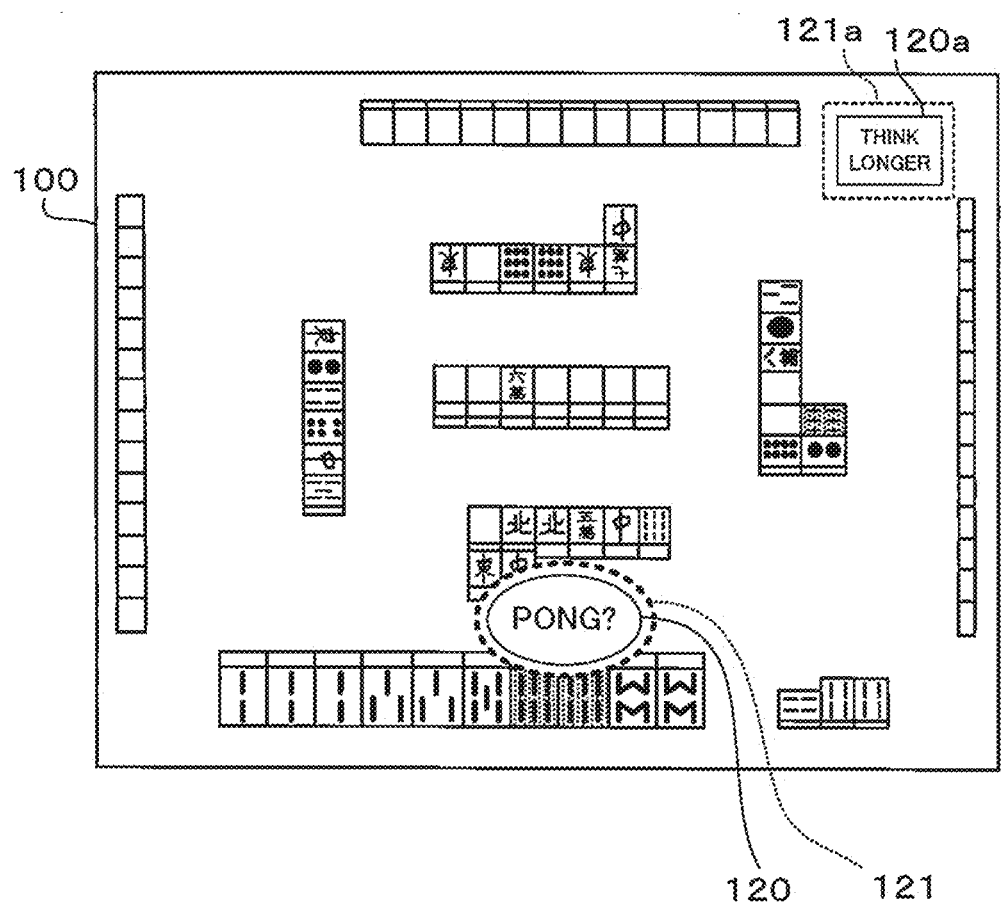
FIG. 7 is a figure showing an example of a game screen.

FIG. 6 is a flow chart showing a game operation control processing that is executed by the game control section 31 of the game machine 3. The game machine 3 provides game play according to a playing charge paid by the player (i.e. the user). When a mode or the like for playing the game is set according to operation by the player, the game control section 31 executes the game (a step S101). In the case of a mahjong game, after selection of the game mode, matching processing is executed in order to determine the players who are to be opponents, and then the game is started. During execution of the game, the game control section 31 determines whether or not touch operation upon the game operation area 121 has taken place (a step S102). If touch operation has occurred, then the game control section 31 executes processing corresponding to this touch operation (a step S103). To explain this with reference to the example of the game screen 100 shown in FIG. 7, when the game operation window 120 is touch operated, the game control section 31 performs "pong". In this manner, during the progression of the game, the game control section 31 performs progression control according to touch operation control by the player. And when the game ends (a step S104), the game control section 31 terminates this cycle of the processing. In the processing described above, the processing of the steps S102 and S103 executed by the game control section 31 functions as the "game operation control device."

Figure 8:
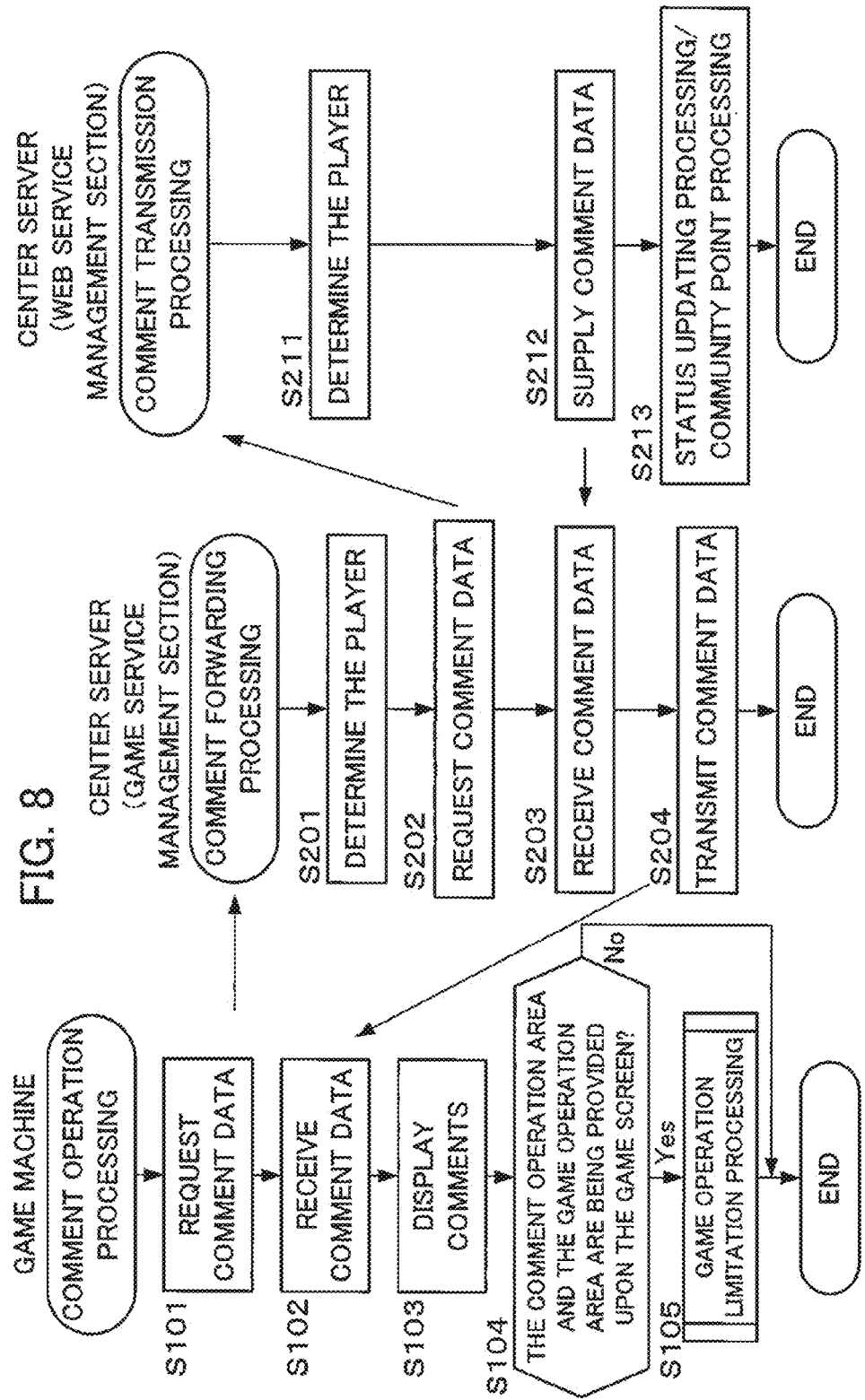
FIG. 8 is a flow chart showing comment operation processing executed by the game control section of the game machine, and comment forwarding processing executed by a game service management section of a center server and comment transmission processing executed by a web service management section of that server.

FIG. 8 is a flow chart showing comment operation processing executed by the game control section 31 of the game machine 3, and comment forwarding processing executed by the game service management section 21 of the center server 2 and comment transmission processing executed by the web service management section 22 of that server 2. Referring to FIG. 8, the processing will be explained when, while the player is playing on the game machine 3, a comment received from some other user is displayed, and touch operation has been performed upon the comment window 110 in which that comment is displayed. When operation is performed to display a comment from some other user upon the game screen 100 while the game is being executed (a step S101), the game control section 31 of the game machine 3 requests the comment data to the center server 2 (a step S111). This comment data is at least a part of the comment information described in the play data 51; for example, it may be information related to comments that have not yet been read. The comment data that is requested may also be designated as appropriate by the player, such as comments from a specified user or the like.

When this comment data is requested from the game machine 3, the game service management section 21 of the center server 2 performs comment forwarding processing, and determines the player of the game machine 3 on the basis of the player's identification information (a step S201). Next, the game service management section 21 requests the web service management section 22 to supply comment data corresponding to the user (a step S202). Upon receipt of this request from the game service management section 21, the web service management section 22 performs comment transmission processing by determining the identification information for this player (i.e. user) (a step S211), and by supplying (a step S212) to the game service management section 21 the requested comment data, among the comment information included in the community data 52, that corresponds to this identification information (for example, to the community ID). And the web service management section 22 performs status updating processing and community point addition processing upon this community data (a step S213).

On the other hand, upon receipt of supply of the comment data from the web service management section 22 (a step S203), the game service management section 21 updates the comment information included in the play data 51, and also transmits the comment data to the game machine 3 (a step S204). And, upon receipt of the comment data (a step S112), the game control section 31 of the game machine 3 displays a comment window 110 related to this comment data that has been received upon the game screen 100 (a step S113). And, according to touch operation by the user upon the comment operation area 121, the game control section 31 executes processing for replying to the comment and so on.

The game control section 31 determines whether or not the comment operation area 111 and the game operation area 121 are being provided simultaneously upon the game screen 100 (a step S114). If the two areas 111 and 112 are being provided at the same time, the game control section 31 executes game operation limitation processing that will be described hereinafter (a step S115), and then this cycle of the processing terminates. In this processing, the processing in the step S114 and a part of the processing in the step S115 executed by the game control section 31 function as the "game operation limitation device."

Figure 9:
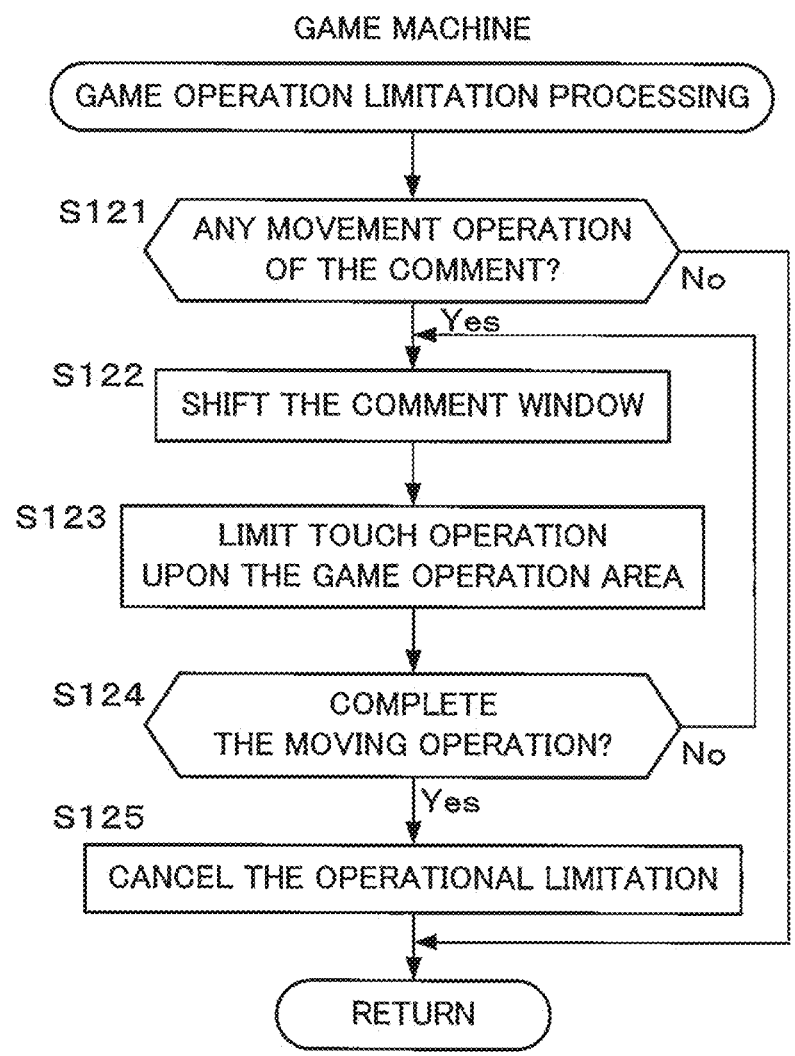
FIG. 9 is a flow chart showing game operation limitation processing performed by a game control section of the game machine.
Figure 10:
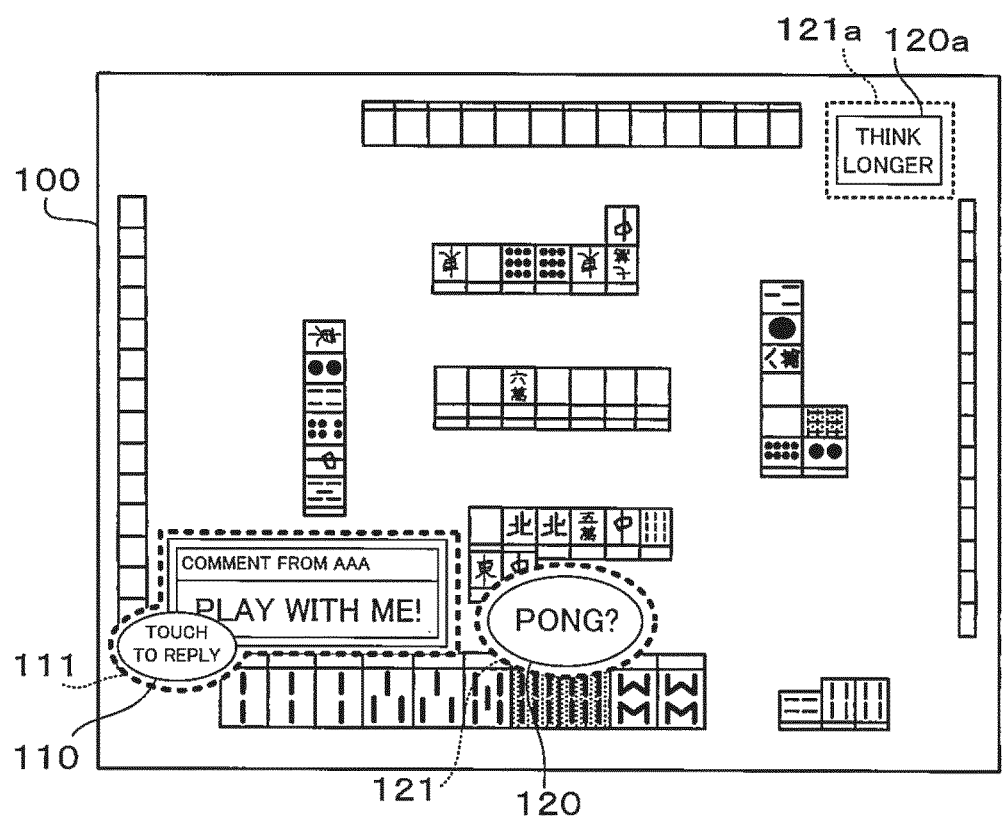
FIG. 10 is another example of a game screen.

FIG. 9 is a flow chart showing the game operation limitation processing executed by the game control section 31 of the game machine 31. The processing of the step S115 of the FIG. 8 processing will now be explained in detail with reference to FIG. 9. This game operation limitation processing is executed when, as shown for example in FIG. 10, the comment operation area 111 and the game operation area 121 are being provided simultaneously upon the game screen 100. First, the game control section 31 determines whether or not there is any movement operation of the comment window 110 (a step S121). Such movement operation is performed by drag operation of the comment window 110, in other words by the user moving the user's finger in the direction in which the user wishes to shift the comment window 110, while the user keeps that finger touching an appropriate position upon the comment operation area 111.

A per se known technique related to drag operation may be employed. If there is movement operation of the comment window 110, then the game control section 31 shifts the comment window 110 according to this movement operation by the user (a step S122). Along with this, touch operation upon the game operation area 121 is limited (a step S123).

Figure 11:
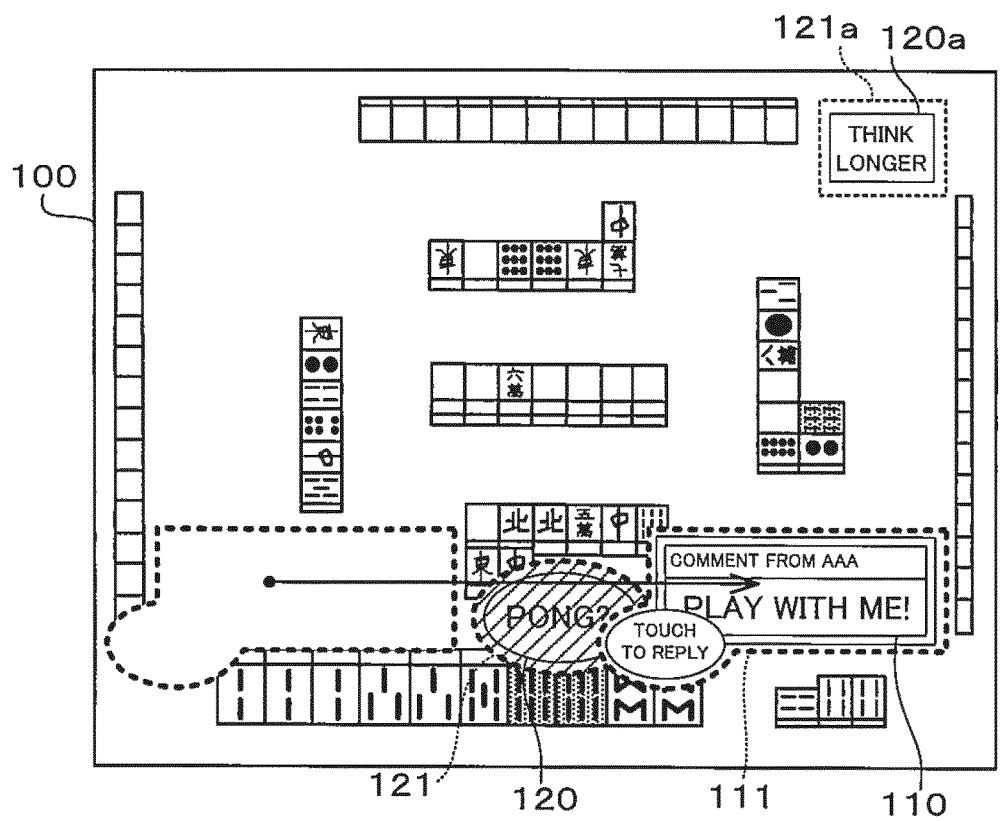
FIG. 11 is yet another example of a game screen.

As one example of limitation upon the game operation area 121, it would be acceptable to arrange to make operation upon the game operation area 121 ineffective during the interval while the player is performing movement operation of the comment window 110. In this case, touch operation upon all of the game operation areas 121 and 121a that are displayed upon the game screen 100 becomes ineffective. Moreover it would also be acceptable to arrange, if the game operation area 121 is positioned upon the path of shifting of the comment window 110 as in the example of the game screen 100 shown in FIG. 11, for only operation upon this game operation area 121 to be made ineffective. In this case, it would also be possible, when the finger that is touching the comment operation area 111 has touched the game operation area 121, for this operation to be made ineffective. Or, when the comment operation area 111 of the comment window 110 which is being shifted overlaps a portion of the game operation area 121, it would also be possible to arrange for touch operation upon this game operation area 121 to be made ineffective. At this time, no limit would be imposed upon operation in the game operation area 121a of the other game operation window 120 a which is displayed upon the game screen 100.

Then the game control section 31 determines whether or not the operation of moving the comment window 110 has been completed (a step S124), and if it has completed then the operational limitation upon the game operation area 121 is cancelled (a step S125), and this cycle of the processing terminates. On the other hand, if the movement operation by the player is to continue, then the game control section 31 returns the flow of control to the step S122 and repeats the processing described above. In this processing, the processing of the step S122 executed by the game control section 31 functions as the "comment operation control device", and the processing of the steps S121 and S123 through S125 functions as the "game operation limitation device".

The present invention should not be considered as being limited to the embodiment described above; it could be implemented in various forms. For example while, in the above embodiment, a game machine 3 was explained as being the game apparatus, this is not to be considered as being limitative. For example, as the game apparatus, it would also be possible to employ a computer device for individual use, such as a user terminal device 4. Moreover, while the operation input unit has been explained as being a touch panel, this is not to be considered as being limitative. It would also be acceptable to arrange to employ a pointing device of any of various types, such as a mouse, a touch pad or the like that drives a pointer displayed upon the game screen. In this case, for example, the comment window 110 could be shifted by performing dragging operation while holding the pointer over the comment operation area 111. And, while an embodiment has been explained in which the comment window 110 and the comment operation area 111 were the same, this is not to be considered as being limitative; it would also be acceptable for the comment operation area 111 to be a portion of a region that is surrounded by the comment window 110, or for the comment operation area 111 to be provided in a different position from the comment window 110. Furthermore while, in the embodiment described above, a mahjong game was explained as being the game executed by the game machine 3, this is not to be considered as being limitative. The present invention could also be applied to games of various other types, such as, for example, a competitive type board game such as shogi, go, sugoroku, or the like, or a card game, a music game, a quiz game, a RPG game, or the like.

What is claimed is:

1. A game system including a game apparatus comprising a display unit configured to display a game screen and an operation input unit capable of inputting an operation to perform specification of a position upon the game screen, comprising:
   a game operation control device configured to receive an operation related to a progression of a game that is displayed upon the game screen within a game operation area that is specified as a partial region included in the game screen, and control the progression of the game on the basis of the operation corresponding to the game operation area;
   a comment operation control device configured to cause a comment to a player to be displayed upon the game screen, and receive an operation for movement of the comment within a comment operation area that is specified as another partial region included in the game screen and control shifting of the comment by shifting the comment operation area on the basis of the operation performed to the comment operation area; and
   a game operation limitation device configured to, when the game operation area and the comment operation area are displayed within the game screen, limit reception of an operation in the game operation area for at least a part of a period that the operation for movement of the comment is being performed to the comment operation area, the game operation limitation device configured to allow reception of the operation in the game operation area and the operation in the comment operation area for a period of time without the operation for movement of the comment.

2. A game system according to claim 1, wherein, according to the operation for movement of the comment, the game operation limitation device limits reception of the operation within the game operation area of which a portion is overlapped with the comment operation area.

3. A game system according to claim 1, wherein:
   the operation of moving the comment is performed by the comment operation control device by the position specified within the comment operation area by the operation input unit being shifted; and
   when the position specified by the operation input unit gets into the game operation area by the operation for movement of the comment, the game operation limitation device limits the operation within the game operation area.

4. A game system according to claim 1, wherein the game operation limitation device limits reception of the operation within the game operation area during an interval in which the operation for movement of the comment is being performed.

5. A game system according to claim 1, wherein the operation input unit is a touch panel that is superimposed upon the display unit and that is transparent to the game screen.

6. A game control method for a game system including a game apparatus comprising a display unit configured to display a game screen and an operation input unit capable of inputting an operation to perform specification of a position upon the game screen, comprising:

a game operation control process configured to receive an operation related to a progression of a game that is displayed upon the game screen within a game operation area that is specified as a partial region included in the game screen, and control the progression of the game on the basis of the operation corresponding to the game operation area;

a comment operation control process configured to cause a comment to a player to be displayed upon the game screen, and receive an operation for movement of the comment within a comment operation area that is specified as another partial region included in the game screen and control shifting of the comment by shifting the comment operation area on the basis of the operation performed to the comment operation area; and a game operation limitation process configured to, when the game operation area and the comment operation area are displayed within the game screen, limit reception of an operation in the game operation area for at least a part of a period that the operation for movement of the comment is being performed to the comment operation area, the game operation limitation process configured to allow reception of the operation in the game operation area and the operation in the comment operation area for a period of time without the operation for movement of the comment.

7. A storage medium storing a computer program to cause a computer of a game system including a game apparatus comprising a display unit configured to display a game screen and an operation input unit capable of inputting an operation to perform specification of a position upon the game screen to function as:

a game operation control device configured to receive an operation related to a progression of a game that is displayed upon the game screen within a game operation area that is specified as a partial region included in the game screen, and control the progression of the game on the basis of the operation corresponding to the game operation area;

a comment operation control device configured to cause a comment to a player to be displayed upon the game screen, and receive an operation for movement of the comment within a comment operation area that is specified as another partial region included in the game screen and control shifting of the comment by shifting the comment operation area on the basis of the operation performed to the comment operation area; and a game operation limitation device configured to, when the game operation area and the comment operation area are displayed within the game screen, limit reception of an operation in the game operation area for at least a part of a period that the operation for movement of the comment is being performed to the comment operation area, the game operation limitation device configured to allow reception of the operation in the game operation area and the operation in the comment operation area for a period of time without the operation for movement of the comment.

* * * * *